Figure 1:
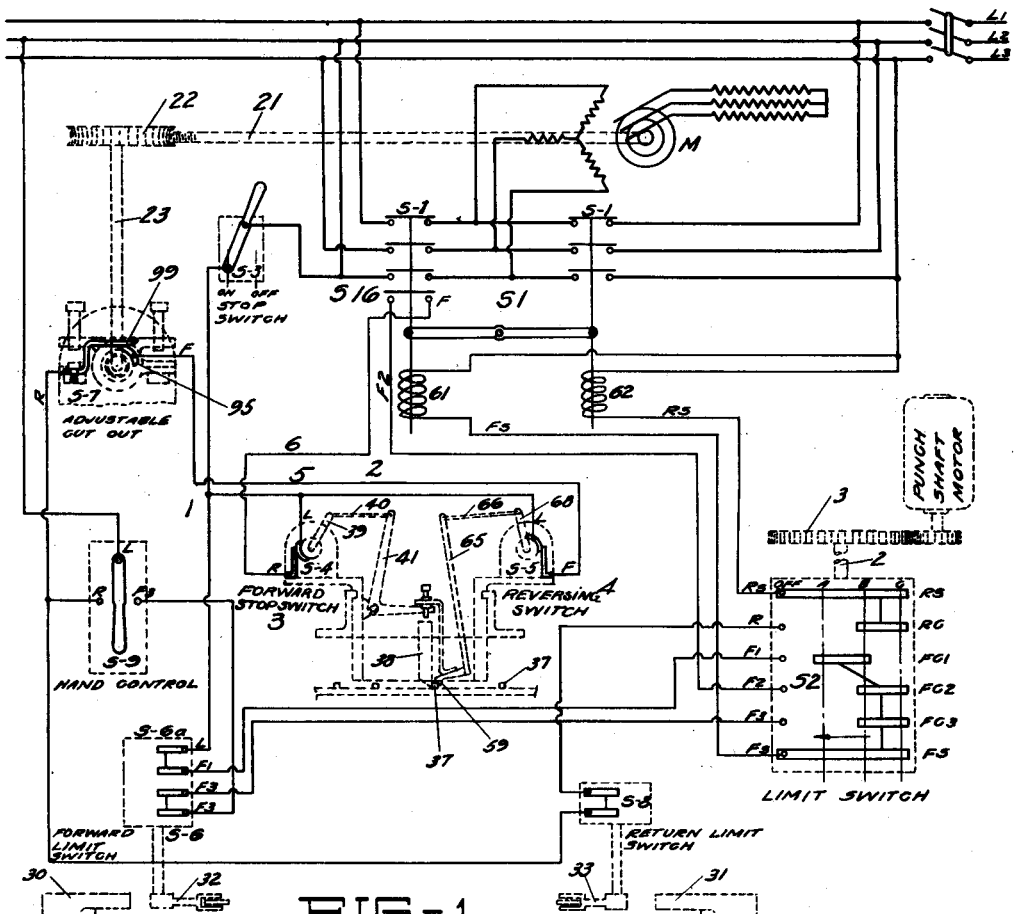

HENRY E. HINTZ
G. P. KLINE   INVENTORS.

BY
Merrill M. Blackburn
ATTORNEY

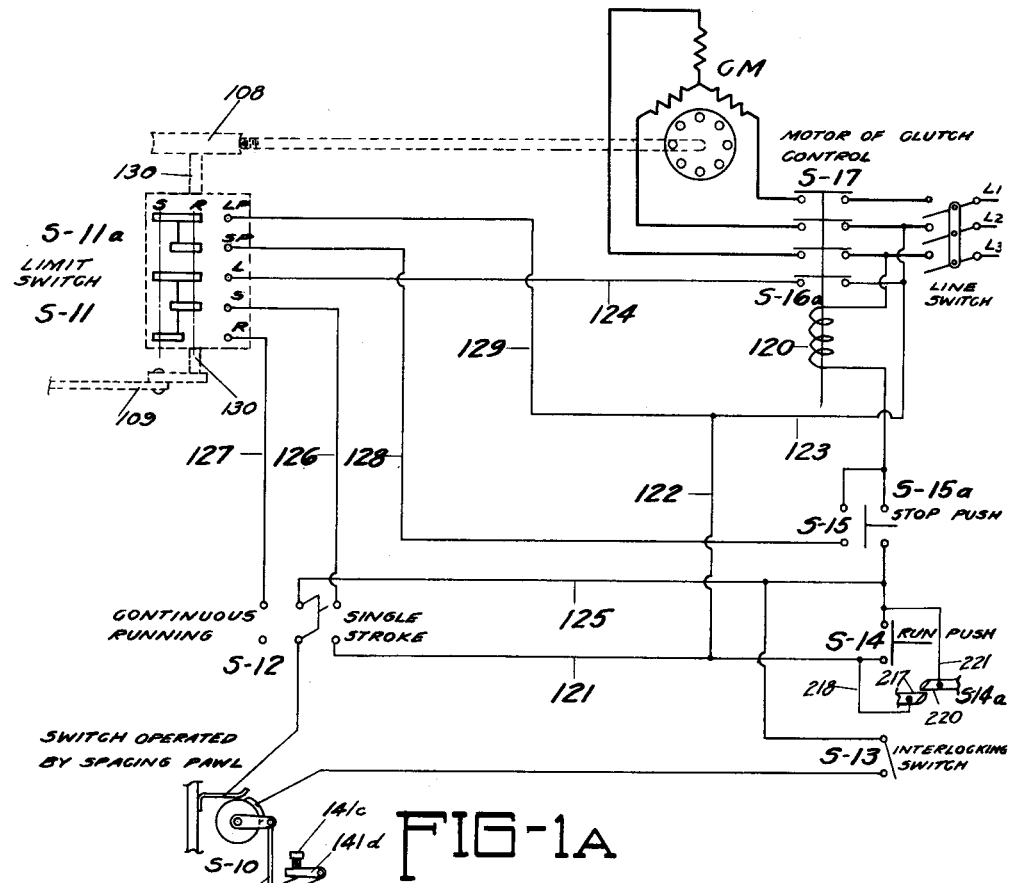
FIG-1A
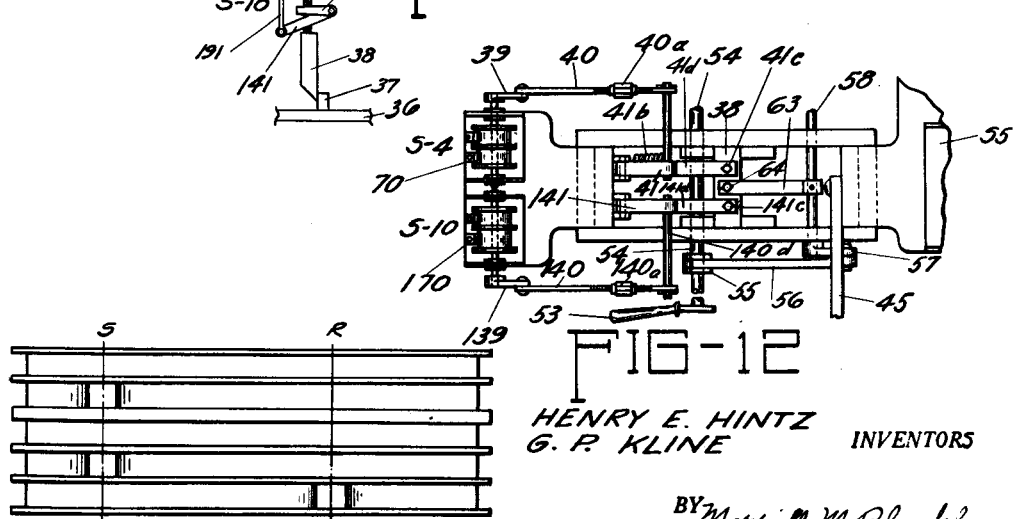
FIG-12
FIG-20
HENRY E. HINTZ
G. P. KLINE INVENTORS
BY Merrill M. Blackburn
ATTORNEY

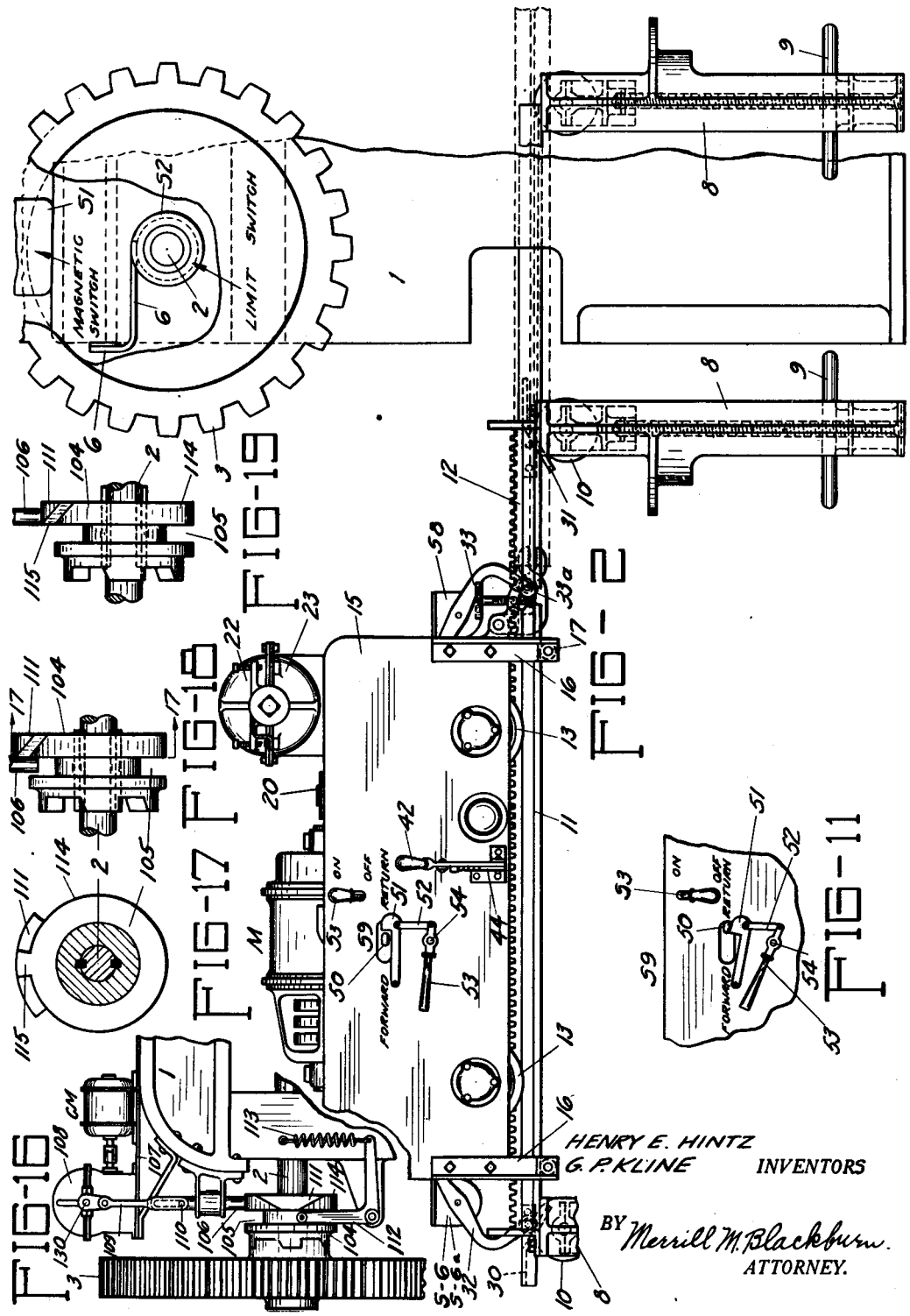

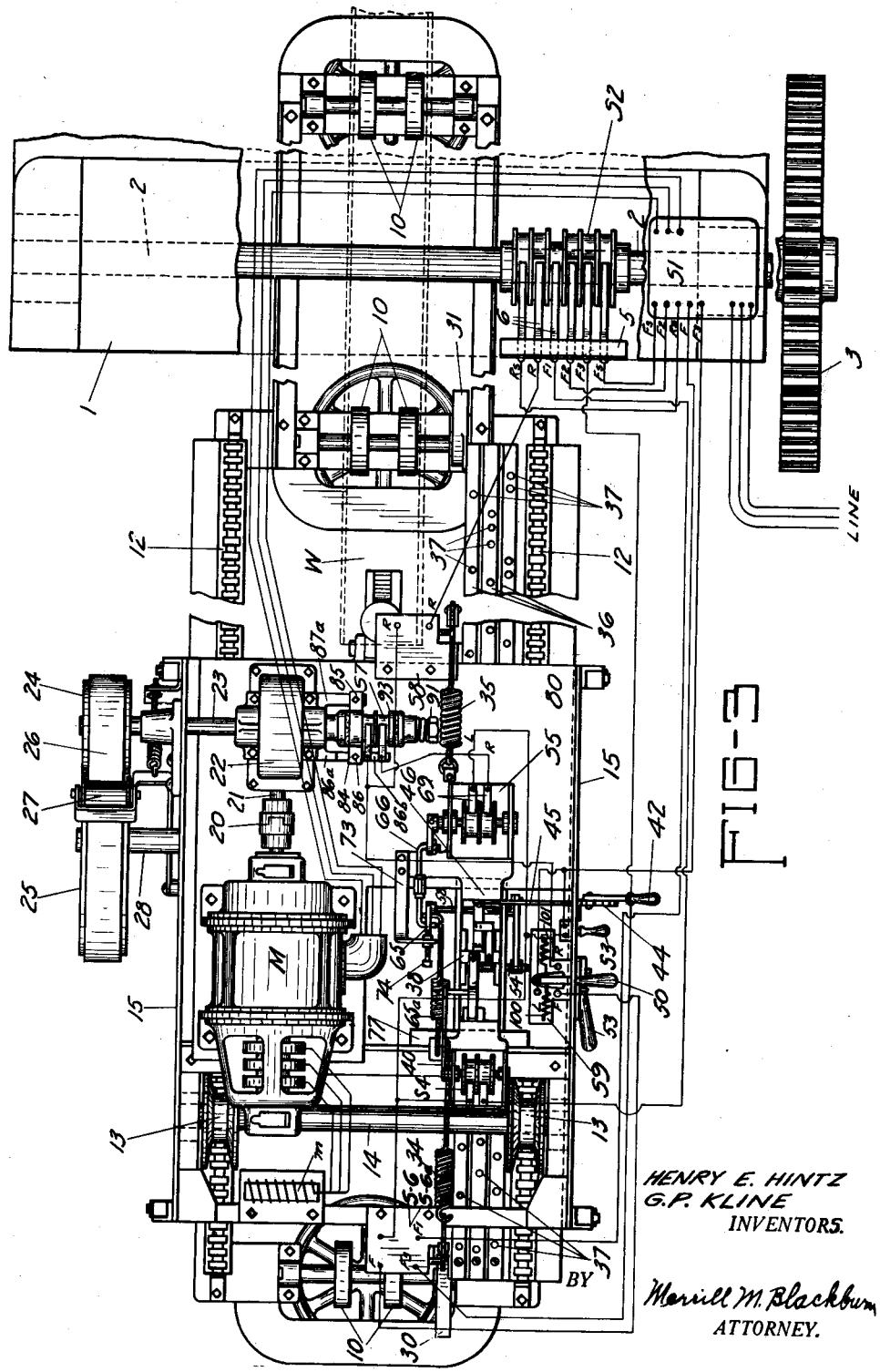

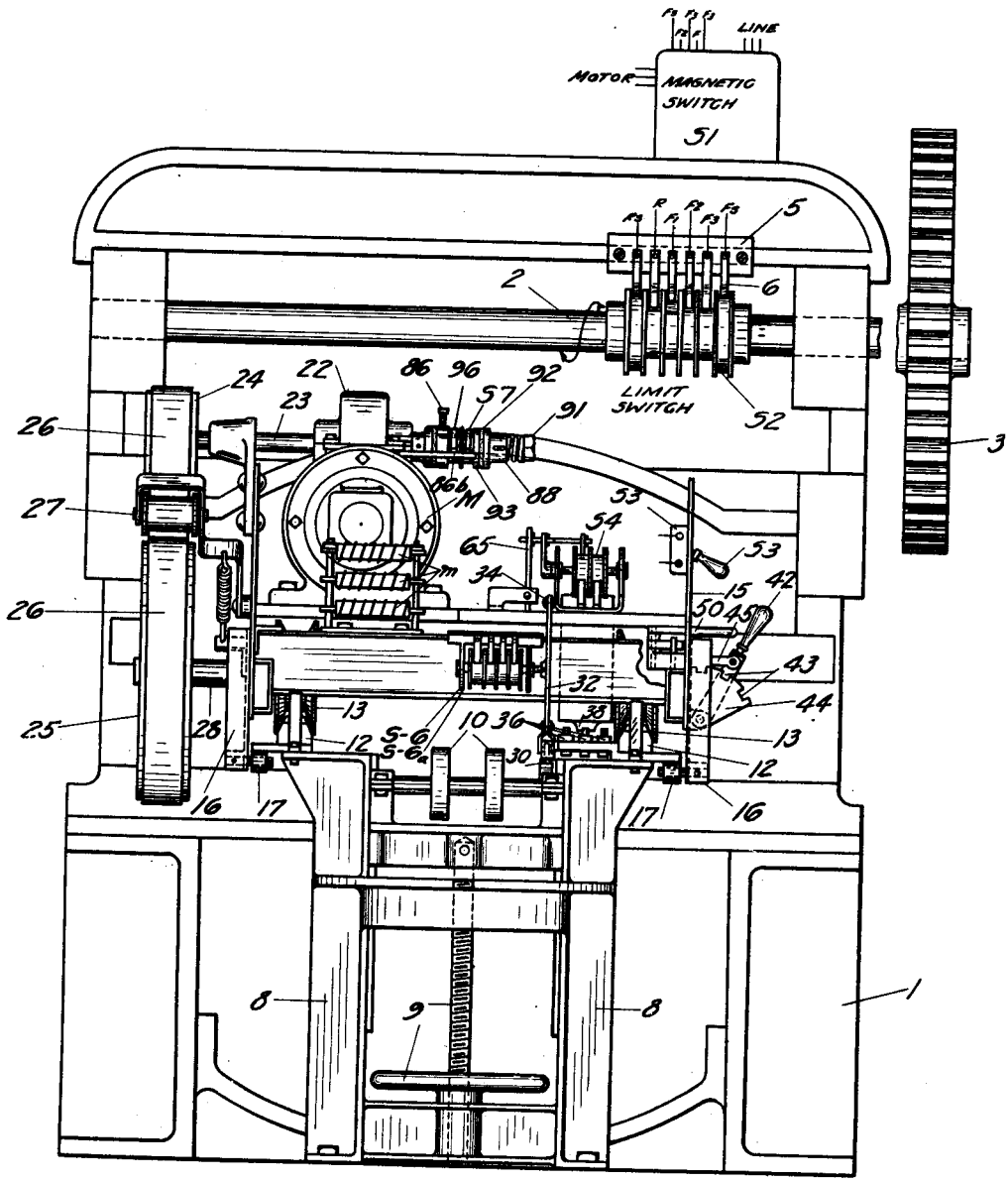

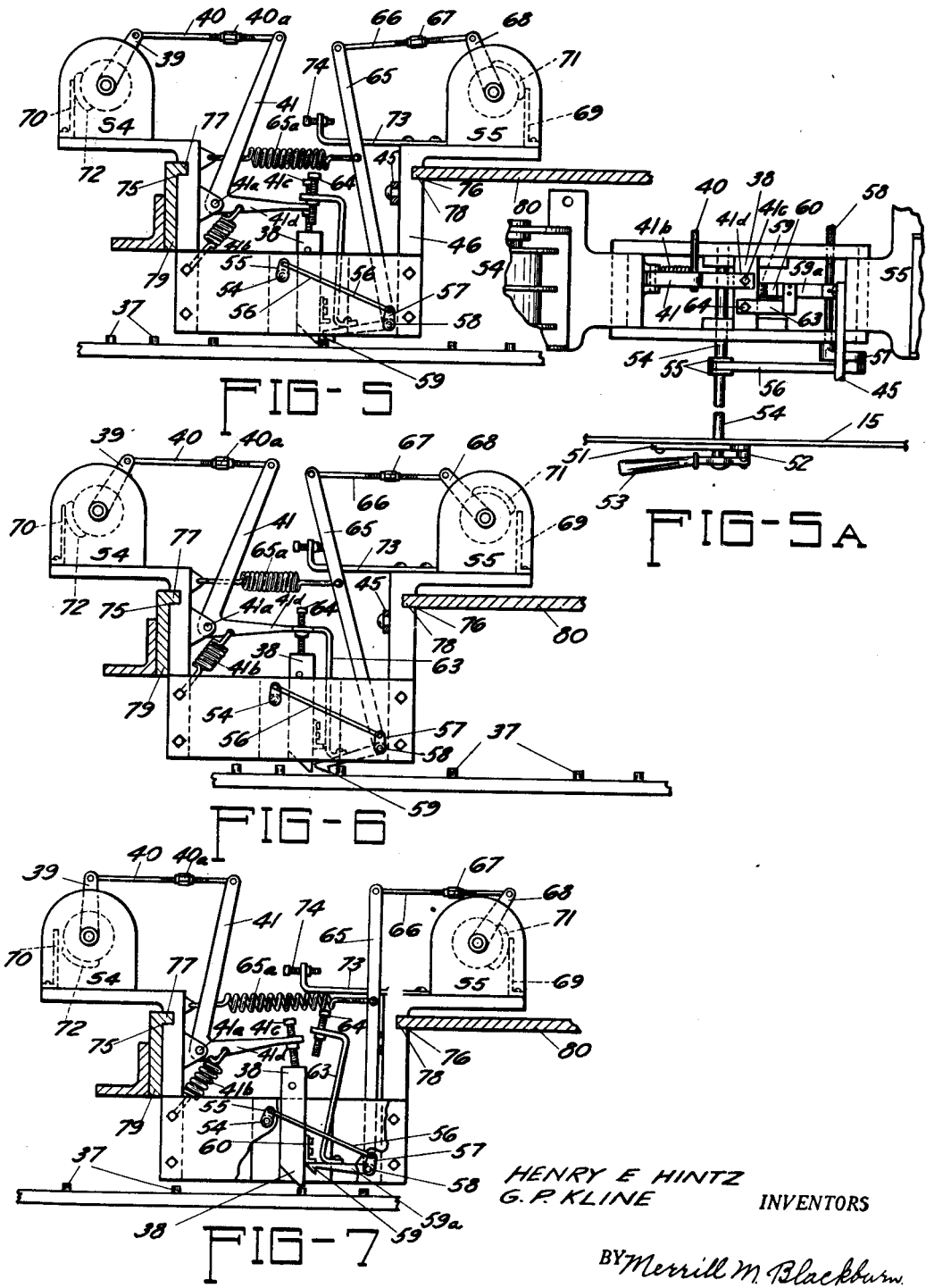

July 18, 1933.  H. E. HINTZ ET AL  1,918,600
SPACING MACHINE
Filed April 8, 1929  10 Sheets-Sheet 7
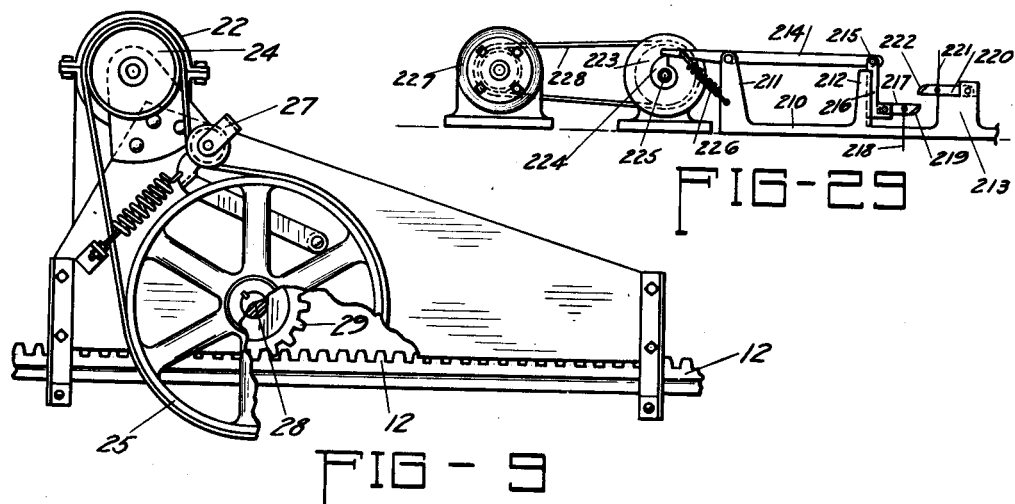
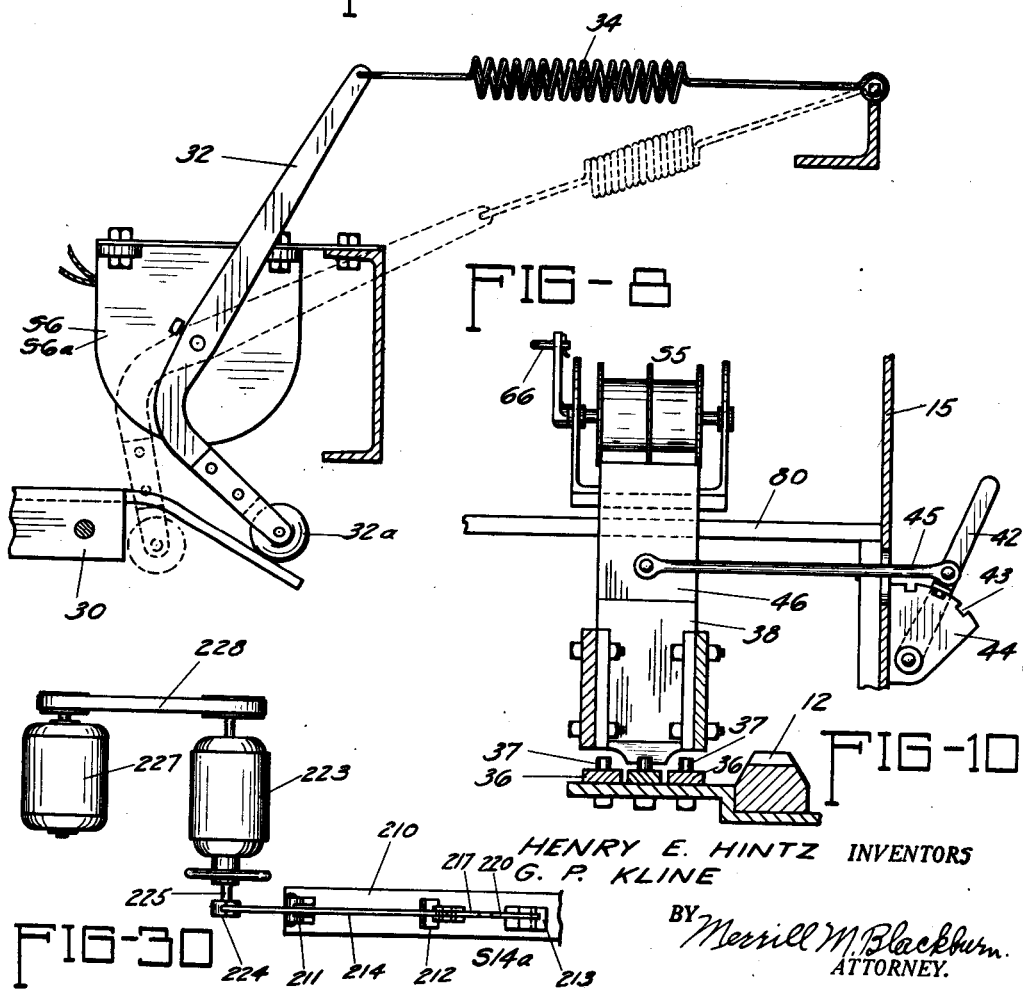
HENRY E. HINTZ  INVENTORS
G. P. KLINE
BY Merrill M. Blackburn
ATTORNEY.

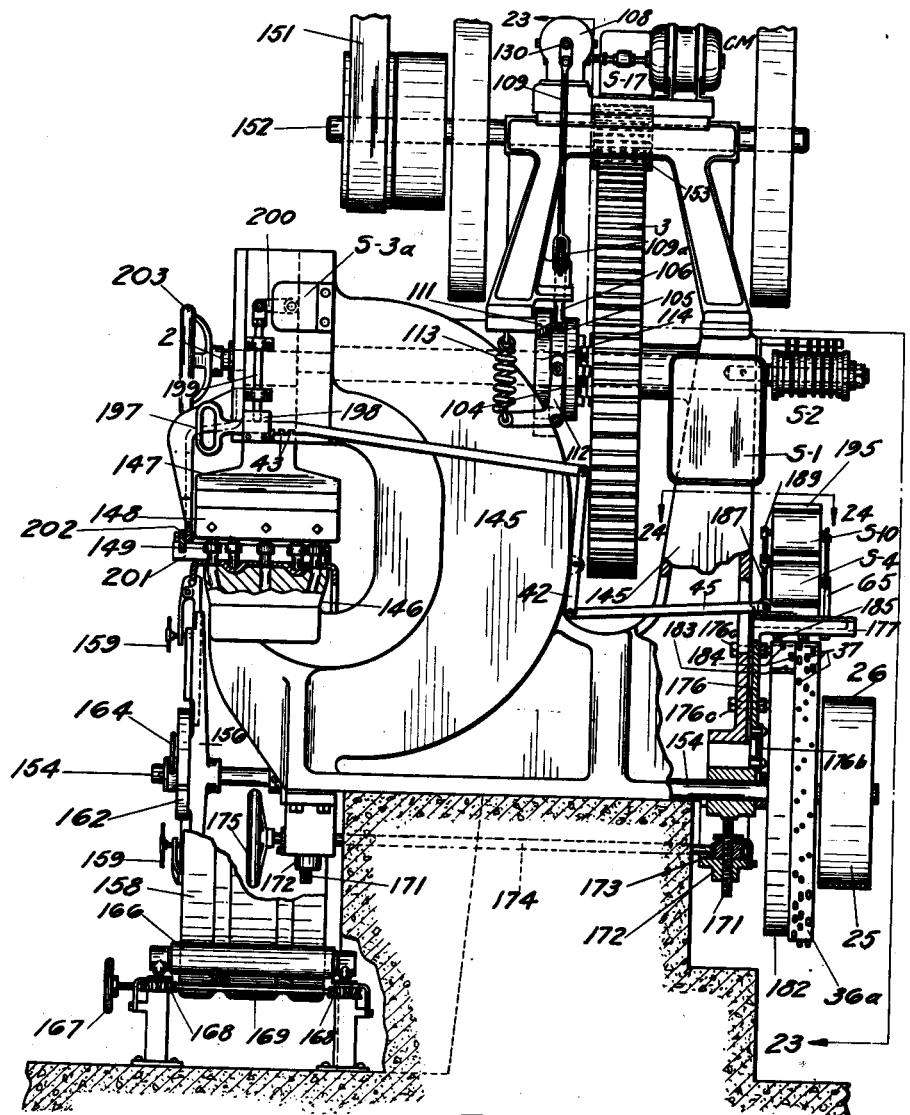

July 18, 1933.  H. E. HINTZ ET AL  1,918,600
SPACING MACHINE
Filed April 8, 1929   10 Sheets-Sheet 9
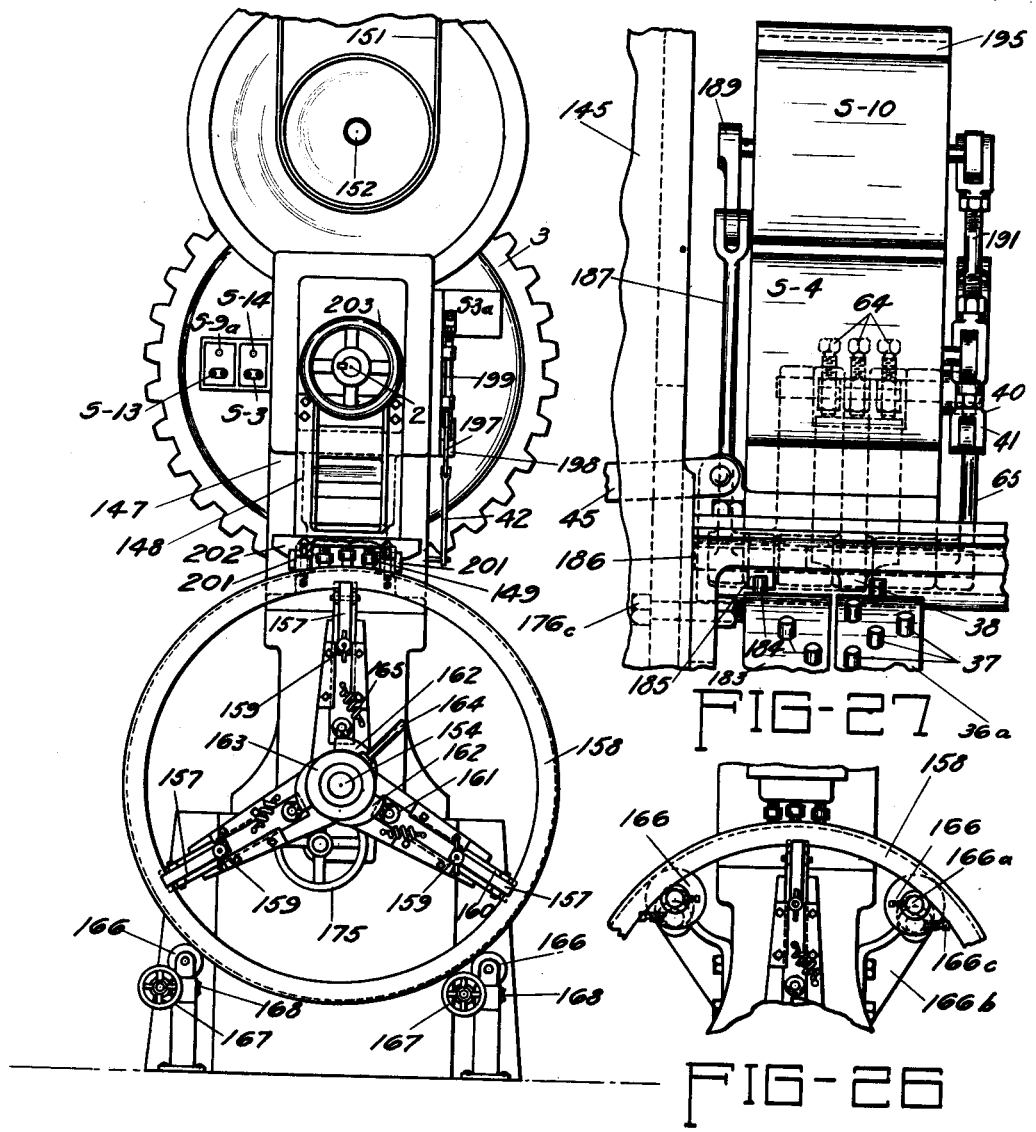
HENRY E HINTZ  INVENTORS.
G. P. KLINE
BY Merrill M. Blackburn
ATTORNEY

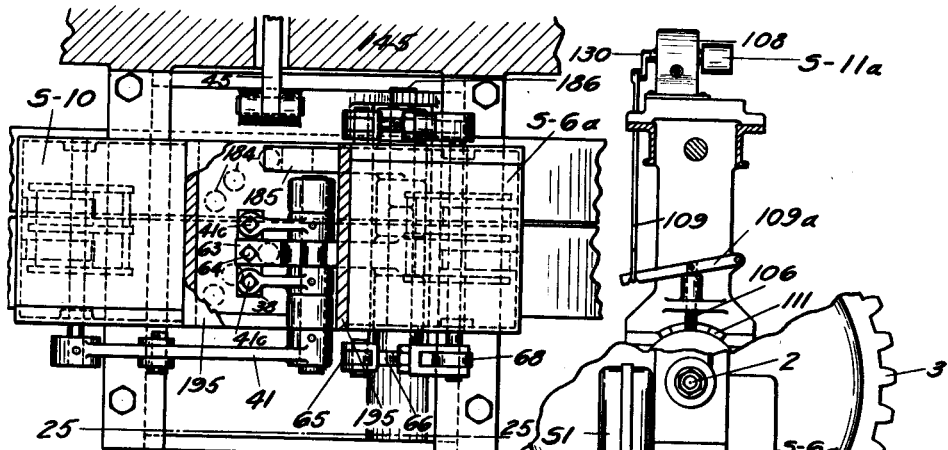

Patented July 18, 1933

1,918,600

UNITED STATES PATENT OFFICE

HENRY E. HINTZ AND GEORGE P. KLINE, OF MOLINE, ILLINOIS, ASSIGNORS TO WILLIAMS, WHITE & CO., OF MOLINE, ILLINOIS, A CORPORATION OF ILLINOIS

SPACING MACHINE

Application filed April 8, 1929. Serial No. 353,461.

This invention relates primarily to means for controlling the movements of a spacing mechanism as well as to means for coordinating a spacing mechanism with a co-operating machine, such as, for example, a punch press, a multiple punching machine, a drilling machine, a riveting machine, or a welding machine. In what follows, the spacing mechanism is designated as the spacer, the cooperating machine as the operator, and the material operated on is designated as the object.

Spacing machines or spacing tables so-called are constructed with rails or runways on which a traveling carriage or sliding table is mounted. The carriage and the object attached thereto travel past or through the operator with stops at predetermined intervals and at each stop the operator performs an operation on the object.

The operators herein described are punching machines but it will be understood that this invention is applicable to other kinds of operators as well as to other objects than those shown.

Novel means are here disclosed for controlling the spacer automatically to make alternate movements and stops in continuous sequence independently of an operator, the time length of said stops and movements being adjustably and independently predeterminable. With this construction the operations to be performed on the object may be made manually or by some hand control device or by a mechanical operator which is adjustable to operate in time relation with the spacer although independently of it.

Novel means are also disclosed for coordinating a spacer and an operator to make fully automatic spacing movements and operations, alternately, in continuous sequence with positive accuracy as well as very much more quickly than is possible with other spacing devices and mechanisms,—all such other devices not being fully automatic except for short spacings and their accuracy being affected either by the momentum of the carriage and brake conditions or by variation in current voltage and the wear of electrical contacting parts.

In this invention, the spacer carriage is stopped by reversing the actuating motor electrically, that is, dynamically,—the reversal and the following cut-out as well as the starting forward again of the motor and carriage after the stop period being accomplished automatically. It is to be understood that the cut-out is adjustable and is in practice adjusted to reduce the duration of the reversing impulse to a fraction of a second, either to stop the carriage instantly or to reverse same slightly, as is desired, and as more fully described hereafter. It is sufficient to say here that when the carriage is reversed the reverse movement is so short and the momentum so slight that at the instant of final stopping, contact may be made with a fixed resistance lug, stop pin or lock, without perceptible shock and thus without danger of breaking the contacting parts.

In contrast with this, all other devices which depend upon stopping the forward motion of the spacer carriage and object against a resistance lug or stop pin or locking device have a very much greater momentum to overcome and must therefore operate the carriage much more slowly in order to avoid breakage of such contacting parts. The novel reversing principle and the means here disclosed to effect the same results in a very marked smoothness of operation and absence of shock and also resultant uniformity and accuracy of spacing at a relatively high rate of operating speed, which it is impossible to accomplish with the other devices used for this purpose which are now in use.

Novel means are also disclosed herein for locking the spacing carriage in contact with the said stop pin or other resistance member to prevent any possibility of recoil and so to assure positively accurate spacing.

To sum up briefly, this present invention is positively accurate in spacing, is fully automatic without regard to the length of the spacing and can be operated more than twice as fast as any other device now in use, with markedly greater smoothness of operation and freedom from shock and injury.

Among the objects of this invention are to produce a structure for the purpose indicated which will function to cause spacing of work with relation to the operating machine, automatically, and without manual intervention, from one end of the work, to the other, if desired; to produce a machine of the character stated which will reduce the time consumed in punching operations; to produce a machine which, while functioning automatically, will produce results which are positively accurate; to produce a machine of the character indicated which will move an article being operated upon variable distances, in accordance with the desires of the users and yet without human intervention; to produce a machine of the character indicated which, though automatic in its operation, is yet subject to manual control when desired; to produce a machine of the nature described which is so constructed that it can be easily and quickly shifted from one set of spacings to another and back again, without any vital or permanent change in the machine; to produce a machine of the character stated which will make the desired spacing automatically and be locked accurately in position until ready for the next forward movement; to provide a machine having various template bars which are readily removable and interchangeable and which serve to control the spacing of the machine during its operation; to provide a machine of the character indicated which, unless manually controlled to cause stopping and starting thereof, will operate until the end of the work is reached and will then automatically stop until the operator manually reverses the machine to cause it to return to initial position; to provide a machine of the character indicated in which, during the normal operation of the machine, all operations are automatic unless and until the operator controls the machine by manual means; to provide a machine of the character described in which the operations are all timed so that they occur in proper sequence and so that there will be no accidents resulting in breakage of the machinery; and such further objects, advantages and capabilities as will hereafter appear and as are inherent in the construction disclosed. Our invention further resides in the combination, construction and arrangement of parts illustrated in the accompanying drawings and, while we have shown therein what is now considered the preferred embodiment, together with a modification thereof, we desire it understood that this disclosure is illustrative only and is not to be construed in a limiting sense.

Figures 13, 14:
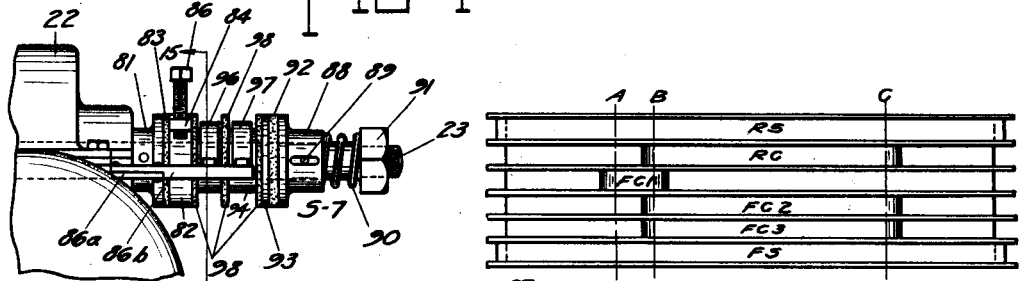
Figure 15:
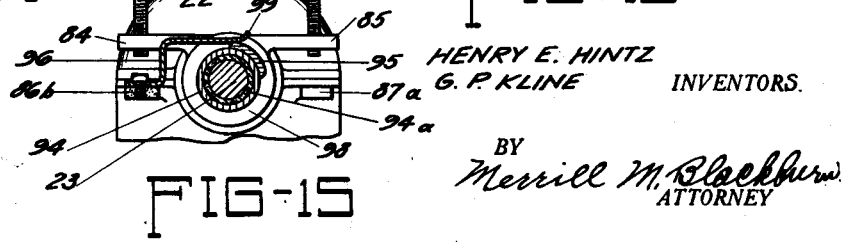

In the drawings annexed hereto and forming a part hereof, Fig. 1 represents a wiring diagram showing the electrical controls for this machine; Fig. 1A shows a similar diagram of another control system to be added to that of Fig. 1 so that the operation of the punch may be controlled by the operation of the spacing machine; Fig. 2 is a fragmentary side elevation of this device as applied to a punch press, parts of the latter being shown in dotted outline and parts of the apparatus being broken away; Fig. 3 is a plan view of the construction shown in Fig. 2, with the wiring diagram of Fig. 1 superposed thereon to show where the various electrical parts are located and how they are connected; Fig. 4 is an end elevation taken from the left side of Fig. 2; Fig. 5 is a view of a portion of the machine shown in Fig. 2 with the side plate removed; Fig. 5A is a plan view of the construction shown in Fig. 5; Figs. 6 and 7 are views similar to Fig. 5 but showing the parts in different operative positions; Fig. 8 is a side view of a limit switch shown in plan view in Fig. 3; Fig. 9 is a detail of another portion of this apparatus with a part thereof broken away, the same being shown at the top of Fig. 3; Fig. 10 is a cross sectional elevation of a portion of Fig. 3 showing the means for shifting from one template bar to another; Fig. 11 is a fragmentary view of a portion of the construction shown in Fig. 2 with the parts thereof shown in different positions; Fig. 12 is a view similar to Fig. 5A but showing a connection for rendering the punch operation dependent on the operation of the spacing machine; Fig. 13 is an expanded view of the limit switch S2, that is, the limit switch, which is in the form of a cylinder, is assumed to be cut open along one side and straightened out into a plane; Figs. 14 and 15 are detail views of the switch S7 shown in Fig. 3, the former being in elevation and the latter in section substantially along the plane indicated by the line 15—15, Fig. 14; Figs. 16, 17, 18 and 19 are fragmentary views illustrating the operation of the punch clutch; Fig. 20 is a lay-out of switches S11 and 114 similar to Fig. 13; Fig. 21 is a sectional elevation showing the application of this invention to a C-frame punch used upon circular work; Fig. 22 is an elevation of the structure shown in Fig. 21 taken from the left side of that figure; Fig. 23 is a fragmentary sectional elevation of the structure shown in Fig. 21 taken from the right side of that figure and represents a view taken substantially along the plane of the broken line 23—23 thereof; Fig. 24 is a fragmentary sectional plan view taken substantially along the plane of the line 24—24, Fig. 21, and may also be designated as a plan view of the structure shown in Fig. 25; Fig. 25 is an enlarged elevation of a portion of Fig. 21, taken from the right in that view; Fig. 26 is a fragmentary view of a modification of a portion of the construction shown in Fig. 22; Fig. 27 is an enlarged view of a portion of the structure shown at the right side of Fig. 21; Fig. 28 is a detached view of a crank for adjusting purposes, this part being shown assembled with related parts in Fig. 26; Figs. 29 and 30 show in side elevation and plan a circuit making and breaking means.

In spacing machines as at present constructed, the provision for spacing is not such as to produce the accuracy desired, without considerable trouble and loss of time. This increases the cost of production. With the present device, it is only necessary for the operator, having adjusted the machine to the spacing required, to set the machine into operation and it will continue such operation until such time as it shuts off automatically or is shut off at the will of the operator. In one form of construction of this device the punch press, or operator, runs continuously and the starting of the spacer is accomplished thereby automatically. In another form of execution of this invention the operator is stopped at each stroke and remains stopped until such time as the spacer shall have reached the proper position for the next punching operation to take place. The operator then starts again, automatically, and performs one punching cycle, and stops until the conclusion of the next spacing movement. For short spacings, the first method is feasible and more rapid, but is impracticable for longer spacings. Either method is available to the operator who can change from one to the other and back again by the operation of a switch.

Referring more in detail to the annexed drawings, numeral 1 is used to designate, in general, a punch press having a shaft 2 driven in any suitable manner through a gear 3. On the punch press is mounted a magnetic switch S1 of old construction but functioning in a new manner in the present combination. Also mounted on the punch press is a carrying member 5 for a plurality of contact fingers 6 which engage the various contacts of a limit switch S2 mounted on and operated by the shaft 2 of the punch press.

A plurality of supporting stands 8, illustrated as having means 9 for adjusting their height to a proper point so that the work carrying rollers 10 may support the work at a proper elevation, are spaced at suitable distances on opposite sides of the punch. A supporting framework 11 is carried at the upper ends of the stands 8 and supports a pair of combined guiding rails and racks designated generally by the numeral 12. Cooperating with these rack rails are spool-shaped supporting and guiding rolls 13, the flanges of which engage the slanting sides of the bars 12 as shown in Fig. 4 to hold the parts in proper lateral position. The spacing carriage is carried on the rails 12 by means of these guiding rolls 13 which are carried on shafts 14 mounted in the spacing carriage. The spacing carriage has side panels 15 which carry upright posts 16 at the lower ends of which are mounted rollers 17, engaging under tracks associated with the rack bars, the purpose of these being to hold the spacing mechanism down upon the bars 12.

A motor M, having external resistances m, is mounted upon the spacing carriage and has its shaft connected through a flexible coupling 20 to a shaft 21. Shaft 21 carries a worm which meshes with a worm gear in the casing 22, the worm gear being mounted on the shaft 23 which latter drives the pulley 24. This pulley drives pulley 25 by a suitable belt 26, which latter is kept taut by any suitable tensioning device as 27. Shaft 28 carries pinions 29 which mesh with the rack bars 12 to move the carriage either forward or backward. (See Fig. 9, sheet 7).

Mounted upon the supporting frame 11 are cam blocks 30 and 31 which are both preferably adjustable longitudinally of the machine so as to vary, as may be desired, the positions in which they become effective in stopping the spacing carriage in its traversing movement. A plurality of switches S3, S4, S5, S6, S6a, S7, S8 and S9 are mounted upon the spacing carriage. The positions of the forward and return limit switches S6, S6a and S8 are shown clearly in Figs. 2 and 3. Secured to the shafts of these switches are cam levers 32 and 33, carrying at their remote ends rollers 32a and 33a, respectively, for engagement with the cam elements constituting a part of the cam blocks 30 and 31 (see Fig. 8). It will be understood that when the carriage moves forwardly until the roller on lever 32 strikes the cam, there will result a turning of this lever about its pivot. This turns the shaft and the drum of forward limit switch S6, S6a resulting in a breaking of the circuit as indicated at the left side of Fig. 1. It will be understood that this switch S6, S6a is normally closed, being held closed by the resilient means 34, as shown at the left end of Fig. 3 and in Fig. 8. The switch S8, which is the return limit switch, operates in a similar manner. This switch is also normally closed, being actuated by spring 35, but is opened by the turning of the lever 33 on its pivot which causes rotation of the switch drum within the casing of the switch S8. The effect of opening this switch will be seen in Fig. 1. The function of these two switches is to break the motor circuit so that the carriage can not be caused, either automatically or manually, to overrun the selected stopping point.

Carried by the framework of the spacer are template or pattern bars 36 each provided with trigger and stop pins 37 which serve, in conjunction with a pawl 38 and cam 59 to determine the stopping positions of the spacing carriage. In Figs. 3 and 4 these stop elements 38 and 59 are shown in alignment with the middle template bar 36. Assuming that the carriage is starting its forward traversing movement the pawl 38 rides up over the first stop and trigger pin 37 rigidly mounted in the template bar 36, and then drops down beyond the pin. The carriage then moves on a fraction of an inch and reverses, until pawl 38 is returned to contact with pin 37. The carriage is now stopped with the pawl 38 in contact with pin 37. A punching operation now takes place and the punch tool is withdrawn from the stock before the next forward movement of the carriage begins. When the punch is clear of the stock the switch S2 is brought to the "A" position by the punch shaft motor, causing motor M to be energized to again drive the carriage forwardly and the pawl rises over the next stop pin 37, the cycle of operation being the same as before and being repeated throughout the length of the machine, or until the machine is stopped manually. Instead of bringing the pawl 38 back against the pins 37, the current through the motor may be reversed to stop the motor and then cut off as soon as the motor starts to reverse. This is not desirable in situations in which great accuracy is required but makes possible the use of less ruggedly constructed template bars or less accurately placed stop pins when extreme accuracy is not required.

Referring now to Figs. 5, 6 and 7, the switch S4 is shown as being provided with a crank arm 39 to which is connected one end of a link 40 having its opposite end connected to a bell crank lever 41. Within the link 40 is a turn-buckle 40a for adjustment of the length thereof. The bell crank is pivoted as at 41a and is actuated in one direction about its pivot by resilient means such as the spring 41b. Adjacent the end of arm 41d, this bell crank is provided with a screw threaded opening in which is mounted an adjusting screw 41c, normally held in adjusted position by means of a lock nut as shown. This screw 41c is utilized for adjusting the position of make and break of the circuit by the switch S4. The turn-buckle 40a can also be used for this same purpose.

The rollers 10 referred to above are mounted on suitable shafts in the machine and serve to support the work in its passage therethrough. In Fig. 3 an I-beam is illustrated and is designated by the letter W. This is secured to the carriage and drawn by it through the punching machine, resting on the rollers 10. After the punching operation has been completed, the work is preferably removed from the machine before the latter is moved back to the starting point. If, however, another series of operations are to be performed on the same work it may be left in the machine and pushed back to the starting point where the work may be shifted to another position for such series of operations.

It is sometimes desirable to have various template bars mounted on the machine so that punchings of different spacings can be made without taking off one template bar and substituting another one. For this purpose, a plurality of bars are used as indicated in Figs. 3 and 4 and the stop pawl 38 is made shiftable transversely of the machine so as to engage the stop pins 37 of one or another of these template bars. In order to accomplish this purpose, a lever 42 is pivoted on the side of the carriage and is provided with means to engage various notches 43 in a notched sector 44. (Figs. 2, 3, 4, and 10.) Connected to this lever is a link 45 which extends through the side of the carriage and engages a movable portion 46 of the machine which carries various parts, among which are the switches S4 and S5, the pawl 38 and associated parts, levers for operating the switches, and various other parts shown in Figs. 5, 6 and 7. As illustrated in Figs. 4 and 10, the lever 42 occupies the middle position and the pawl 38 also occupies a middle position, in which position it cooperates with the middle template bar. If the lever 42 were moved to the right in Fig. 4 it would shift the mechanism referred to above toward the right until the pawl 38 would engage with the stop pins of the right hand template bar. On the other hand, if the lever 42 were to be moved toward the machine until it interlocked with the notch 43 nearest to the panel 15 the pawl would be shoved over to cooperate with the left hand template bar.

As indicated above, the carriage automatically stops when it reaches the left hand end (Fig. 2) of its course of travel. In order to reverse the direction of travel to get the carriage back to its starting point again, use is made of a switch S9 (see Figs. 1 and 3). This switch is a hand control by means of which the carriage may be caused to move forwardly or backwardly at will, independently of any automatic control. However, before using this switch the switch S3 is put into "off" position. The handle 50 of switch S9 projects laterally from the panel 15 as shown clearly in Figs. 2 and 3. In these two figures, this switch is shown in the neutral position, being normally held in that position by springs 100 and 101. If it is desired to cause the carriage to move forwardly the handle 50 may be moved to the left in the direction of the word "Forward". This will close the circuit through the contacts L and F of the switch S9 (Fig. 3), causing the carriage to move forwardly, unless the forward limit switch S6 is open. The handle 50 can not be put into the return position so as to close switch S9 for return movement without first getting the locking arm 51 out of the way of the handle 50. This is connected by a link 52 with the lever 53 (Fig. 3) which is rigidly secured to the shaft 54. Also rigidly secured to this shaft 54 is a crank arm 55 which is in turn connected by a link 56 with a crank arm 57 rigidly secured to the shaft 58. Also rigidly connected to the shaft 58 is an arm 59a carrying the cam 59. This cam 59 is in line with the stop pins 37 and follows the pawl 38 in riding up over these stop pins. When positioning the parts to travel in the reverse direction, actuation of the lever 53 rotates the shaft 54 and with it the shaft 58. This in turn causes the cam 59 to be lifted above the stop pins 37. As it rises, it engages a lug 60 on the pawl 38 and lifts that out of the way so that it can not strike the stop pins 37 as the carriage travels backwardly in its return movement. Having moved the lever 53 upwardly into the position shown in Fig. 11, it is possible to move the lever 50 to the right into reverse or return position, closing the circuit through the appropriate contacts of switch S9. During the return movement of the carriage, the circuit through the actuating coil 61 of the magnetic switch will be open by reason of the fact that switch S3 is open as indicated above. The circuit through the coil 62 will be closed because the switches S2, S8, and S9 are closed. The switch S2 is closed in the C position (Fig. 1) because it is carried on the shaft of the punch and this always stops with the punching tool in the up position and the master switch S2 in the C position. Though the punch motor runs continuously the punch ram is stopped at intervals, this being accomplished by disconnecting the punch motor from the punch shaft by releasing the punch clutch (see Fig. 16, sheet 3). Because current is flowing through the coil 62 the contacts of switch S1 are reversed so that the direction of travel of the traversing motor M is reversed. This causes the carriage to move backwardly on the supporting framework. The operation of the punch clutch will be described hereinafter.

Secured to the arm 59a carrying the cam 59 is a bracket 63 which has threaded therein an adjustable screw 64 adapted to contact with the pawl 38. When the latter rises in passing over the stop pins 37 it actuates the bell crank lever 41, the bracket 63, and the arm 65, thus actuating the switches S4 and S5. This latter is accomplished by reason of a connecting link 66 which engages the arm 68 rigidly secured to the drum of the switch S5. A turn-buckle 67 in the link 66 makes it possible to adjust the point at which the contacts of switch S5 will make and break the circuit therethrough. A spring 65a pulls the arm 65 away from switch S5, thus opening the circuit therethrough. Contact fingers 69 and 70 cooperate with the contacts 71 and 72 of these switches in an obvious manner. A bracket 73 carried by the support for switch S5 carries an adjustable stop 74 (see Figs. 3 and 5 to 7) to limit the distance the cam 59 may drop, thus keeping the cam out of contact with the template bar. The automatic reversal is described later in the specification.

At 75 and 76 are notches in the supporting members for the switches S4 and S5 and these are engaged respectively by the flange 77 of the frame member 79 and the edge 78 of the frame plate 80. By reason of this connection, the framework carrying the switches S4 and S5, the pawl 38 and cam 59 and their associated parts, can be shifted transversely of the carriage, the springs 34 and 35 yielding sufficiently to permit this to be accomplished.

The mechanism whereby reverse movement of the carriage is stopped when the pawl 38 is brought back into contact with stop pins 37 will now be described. Shaft 23 (Figs. 3, 14, and 15) is extended in the opposite direction from pulley 24 and has secured thereto a collar 81 between which and the loosely mounted collar 82 is a friction facing 83 which tends to cause the collar 82 to rotate with the collar 81 and shaft 23. The collar 82 carries a pair of oppositely extending arms 84 and 85 in which are mounted adjustable stops 86 and 87 whereby the amount of rotation of the collar may be predetermined. By adjusting one or both of these stops 86 and 87 the amount of rotation and the point of stopping may be adjusted to predetermine the point where the electric circuit will be broken to stop the reverse movement of the carriage. Cooperating with the stops 86 and 87 are a pair of brackets 86a and 87a which serve to limit the rotary movement of the collar 82. A collar 88 is slidable on the shaft 23 and is prevented from rotation relatively to the shaft by means of a pin and slot connection 89. A spring 90 abutting at one end against the collar and at its other end against a nut 91 furnishes the necessary tension to force this collar inwardly to compress longitudinally of the shaft 23 the parts between the collars 81 and 88. The nut 91 is adjustable to vary the tension of the spring 90 and its compression of the parts between it and the collar 81. Friction material 92 is placed between the flange of the collar 88 and the disk 93 which bears against an insulating disk 98 and holds it against the end of the sleeve 94. Mounted upon the shaft 23 and extending through collar 82, disk 93 and sleeve 94 is an insulating sleeve 94a which insulates all of these parts from the shaft 23. The sleeve 94 has secured thereto a pair of contact elements 95 which are engaged by contact fingers 96 and 97 when the shaft rotates in one direction. These contact fingers are carried by insulating section 86b and 87b of the brackets 86a and 87a. When shaft 23 rotates in the opposite direction, the contact fingers leave the contact segments 95 and break the circuit therethrough. Placed upon opposite sides of the contact segments 95 and insulating the contact fingers 96 and 97 from each other and adjacent collars are insulating washers 98 which prevent short circuits from occurring between the contact fingers. It will be observed that the ends of the contact fingers are turned upwardly as indicated at 99 to enable these fingers to ride up on the segments without stopping them from rotation when the fingers are brought into contact therewith by movement of the shaft 23. Other forms of construction may be resorted to, the construction shown being used merely for purposes of explanation.

Figs. 16 to 19 inclusive show the punch clutch and the mechanism for operating same. As indicated above, numeral 2 designates the punch shaft which operates the punch ram. On this shaft is mounted the gear 3 which meshes with a pinion mounted on the shaft of the punch motor (see Fig. 1). The gear 3 is loosely mounted on the shaft 2 and may turn relatively thereto, unless prevented from doing so by the slidable clutch element 104 which is splined or otherwise slidably connected to the shaft. The clutch element 104 has a groove 105 therein for reception of the clutch pin 106. Clutch element 104 may slide freely on shaft 2 when the pin 106 is withdrawn from the groove 105. This is accomplished by the clutch motor CM mounted on the punch frame 1. There are various ways of mounting this motor on the frame and actuating the pin 106 therefrom. In the drawings a bracket 107 is shown as supporting the clutch motor in laterally offset relation to the frame 1. A speed reduction gearing of any suitable type, for example a worm drive, may be mounted on the bracket 107 in a suitable casing 108. A link 109 has a pin 110 extending therethrough, this pin passing through a slot in pin 106 as shown. This permits the link 109 and pin 106 to have relative sliding movement during operation.

Fig. 16 shows the elements in the driving position in which the punch ram is in operation. Fig. 18 shows a portion of these parts in the positions they occupy when the clutch element 104 is withdrawn from engagement with the cooperating part of gear 3. This clutch element, as indicated above, is held out of engagement by means of the pin 106 which rides in the groove 105. Fig. 17 is taken substantially along the plane indicated by the line 17—17 in Fig. 18. On the face of the clutch element 104 is a double cam 111 upon which the pin 106 rests when withdrawn from the groove 105 as indicated above. It will be seen by comparing Figs. 18 and 19 that, if the pin 106 is withdrawn from the groove 105, it will assume the position shown in Fig. 19. The clutch element 104 can not start to rotate until it engages with the cooperating clutch element on gear 3 which turns freely on shaft 2. This motion along the shaft 2 is caused by a bell crank lever 112 which is actuated by any suitable means, such as a spring 113, arranged to lift the other arm of the bell crank lever. When the parts are in the position shown in Fig. 19 the clutch element 104 rotates with the shaft 2 and the pin 106 drops off from one end of the cam 111 and rides along the surface 114 of the clutch element 104. It will therefore be seen that as the clutch element 104 rotates one of the cam faces of cam 111 will come in contact with the pin 106 and, since the latter can not yield, the clutch element must yield and will be withdrawn along the shaft 2 from engagement with the cooperating clutch element on the gear 3. When the clutch elements have been completely separated, element 104 will stop rotating. Therefore the shaft 2 and the ram are also stopped. When this takes place, the pin 106 slides down the face 115 of the cam 111 and into the groove 105 as shown in Fig. 18. As indicated above, the clutch motor CM causes the speed reduction gear to make a complete turn and stop with its crank pin in lowermost position. This can take place, even though the pin 106 is not in lowered position, by reason of the fact that a slot is provided in pin 106 for the pin 110, thus permitting the pin 106 to be raised and left in elevated position as the shaft of the clutch motor continues its rotation to stopping position. This position is determined by the limit switch S11 (Fig. 1A), carried by the shaft 130 of the gear reduction mechanism in casing 108 referred to above.

By comparing Figs. 5A and 12 it will be found that there is considerable similarity between them. As a matter of fact, the construction of Fig. 12 is the same as that of Fig. 5A except that switch S10 has been added thereto to be actuated in the same manner as switch S4 except that when switch S4 is closed, switch S10 is open and vice versa. This switch has a shaft on which is mounted the drum carrying segments corresponding to segments 72 but differently placed thereon with relation to the contact fingers 170 from the relation of contact fingers 70 to segments 72. On the shaft is mounted a crank arm 139 connected to a link 140 which is connected at its opposite end through an extension 140d to a crank arm 141. An extremity of this crank arm is perforated and screw-threaded as in the case of switch S4 and has a screw-threaded member 141c adjustably secured therein for the same purpose as member 41c. The function of this switch will be set forth in describing the operation of the control system shown in Fig. 1A.

*Operation*

Referring now to Figs. 1 and 1A, the operation of the machine shown in Figs. 1 to 20 will be described. It will be understood that when this system is used with a punching machine the spacing will always take place when the ram is in the up position, that is, the position which it occupies when a punching operation has been completed and the punch withdrawn from the material. In this position, the spacing machine is ready to begin its spacing operation and, if the line switch has been open, this is closed and current then flows through the forward switch operating coil 61 of the magnetic switch S1 and through the limit switch S2 which, as stated above, is carried by the punch shaft. This is so mounted with relation to the punch shaft that the "A" position corresponds to the position of the punch after it clears the stock. The F1 contact of the limit switch is in engagement with the corresponding contact segment FC1 thereof so that the circuit is completed through the limit switch from Fs to F1. This circuit is closed at this point after the punch becomes cleared of the stock. It should be kept in mind that the hand control switch S9 normally rests in neutral or "off" position (being resiliently held in such position by springs 100 and 101) so that the circuits controlled thereby are normally open, unless closed manually by the switch S9. It should also be kept in mind that the forward and reverse or return limit switches S6 and S8 are normally closed, being opened only when the spacing carriage reaches the position predetermined for its forward or return limit. The stop switch S3 is open when it is not desired to have the spacing mechanism automatically actuated, but is closed when the machine is to operate automatically.

It will be seen from Figs. 3, 14 and 15 that the drum of the adjustable cutout switch S7 is mounted on the shaft 23. This drum therefore rotates a short distance with the shaft when the traversing motor M is moving. However, the adjustable stops 86 and 87 are provided for limiting the amount which this drum may rotate. When these adjustable stops strike the brackets 86b or 87a, the drum begins slipping on the shaft and will not turn further. In this way, the switch always closes with a forward movement of the machine and opens with a return or reverse movement thereof. From this it will be evident that this switch is normally closed when the carriage is moving forwardly and opens shortly after the carriage starts to move in a reverse direction. The amount of rotary movement of the drum is predetermined by the positioning of the adjustable stops 86 and 87. The purpose of this will presently be explained.

The purpose of switches S4 and S5 can best be explained in connection with Figs. 1 and 5 to 7. The arrangement of parts shown in Fig. 5 is that in which the operation of the punch through the stock takes place. In this position switch S7 is open so that there is no current flowing therethrough, even though the switch S5 is closed. Switch S4 is closed but no current is flowing therethrough because coil 61 was de-energized by the momentary opening of S4 when the spacing pawl rode up on the stop pin 37. When this coil became deenergized the S1 switch assumed neutral position. Also, the R contact finger passed onto its contact segment RC of the S2 switch resulting in the coil 62 being energized and the reverse side of the S1 switch being closed. This is indicated as the B position of the limit switch S2. This, however, started the motor M in reverse direction which caused the opening of switch S7. There is therefore no current flowing through any part of the circuit shown in Fig. 1, when the parts are in the position shown in Fig. 5. At that time, that part of switch S2 which is designated in Fig. 1 as "off" is passing underneath the contact fingers. It is during this time that the punch tool goes through the stock and withdraws. When the tool is clear of the stock the FC1 segment of switch S2 engages the F1 contact finger, closing the circuit through coil 61, switches S2, S6a and S3. This results in closing the F side of switch S1, causing the traversing motor M to move forwardly. With the beginning of the forward movement of the motor shaft, switch S7 is closed, pawl 38 is in front of pin 37, cam 39 is behind this pin, as shown in Fig. 5. As the carriage moves forwardly, cam 59 rides over pin 37, dropping down as it moves beyond this pin, causing lever 65 to move to the left, thus opening switch S5, as in Fig. 6. On reaching the next spacing pin, pawl 38 rides over the spacing pin 37, rising as it does, and causing levers 41 and 65 to turn on their pivots, thus causing movement of the contact drums of switches S4 and S5. This movement is enough to make the circuit through switch S5 and break the circuit through switch S4. Since return limit switch S8 is normally closed the circuit is now complete through 62, S2, S8, S7, S5, and S3. Energizing coil 62 reverses the motor as indicated above and causes the carriage to reverse. This however is but momentary, as reversal of motor M opens switch S7 at the time or just before pawl 38 strikes pin 37, thus bringing pawl 38 into rigid contact with pin 37 as shown in Fig. 5. Continued operation of the punch will result in repeating the above cycle. It will of course be understood that motor M, through its worm drive in casing 22, serves as a lock to prevent rebound of the carriage which is thus positively held with the pawl against the pin 37, thus assuring automatic accurate positioning at all times.

If the spacing carriage has reached the limit of its travel and has been stopped by actuation of forward limit switch S6, S6a or if it is desired to stop the automatic operation of the spacing machine and reverse the direction thereof, switch S3 is actuated manually into "off" position and then lever 53 is raised to get interlocking detent 51 out of the way of switch handle 50 (see Fig. 2). As explained above actuation of the lever 53 causes 59a to be raised into position as shown in Fig. 7. This raises spacing pawl 38 above spacing pins 37, opening switch S4 and leaving switch S5 closed. Moving switch handle 50 to the right now causes the carriage to be reversed, as described above in detail.

The foregoing description applies to the operation of a machine not provided with the electrical device outlined in Fig. 1A. The operation of a machine to which this device is attached will now be described.

Starting with no current supplied to any of the motors, the first thing to do is to close the circuit to the punch motor. This then begins to run, turning gear 3, and the punch ram will be actuated as soon as the clutch between gear 3 and shaft 2 is closed to cause driving of the ram shaft 2. After starting the punch motor the next thing to do is to close switch S3 and then S13. If, now, S9 is closed momentarily to cause forward motion of motor M energization of coil 61 will be caused, thereby closing switch S1 and starting motor M. When motor M starts it causes the spacing carriage to be moved forwardly to the first punching position as explained above. When this occurs, pawl 38 rides up over a pin 37 and this causes the closing of switch S10 which is normally open. (See Figs. 1A and 12.) With switch S13 (Fig. 1A) closed and switch S12 closed, on the "single stroke" side, the closing of switch S10, momentarily, closes the circuit from the line through the energizing coil 120 of the magnetic switch S17, through switch S15a, which is normally closed, through interlocking switch S13, switch S10, switch S12 and back to line through wires 121, 122, and 123. As soon as the magnetic switch S17, S16a is closed, a circuit is completed through switch S15a, the upper half of the switch S12 on the "single stroke" side, and S to L of the limit switch S11, back to the line through 124 and S16a. This then causes holding of the magnetic switch closed until the circuit is broken by rotation of the limit switch S11 to the "S" position. This will then break the circuit through the coil 120 and result in the opening of the magnetic switch and the stopping of the motor CM of the clutch control. This series of operations results in a single turn of the punch shaft and then stopping thereof.

For continuous running the double throw switch S12 is thrown to the "continuous running" side instead of the "single stroke" side and the switch S14 is closed momentarily. The circuit now is from the line through the magnetic coil 120 of magnetic switch S17 through the switch S15a, switch S14 and back to the line through 122 and 123. This closes switches S16a and S17. Switch S11 being in the S position, current now flows through 120, S15a, 125, S12, 127, R and L of S11, 124 and S16a to line and causes the turning of the limit switch S11 from the S position to the R position. This results from the fact that the switch S11 is on the shaft 130 of the reduction gearing in case 108. (Figs. 16 to 21.) When the limit switch reaches the R position the circuit through the coil 120 of the magnetic switch S17 is broken and that switch is then permitted to open, thus stopping motor CM with pin 106 in up position, which is just the reverse of the operation described above in connection with Fig. 1. When the limit switch is in the R position, the clutch pin 106 controlling the operation of the punch shaft is withdrawn and the punch clutch is closed or engaged so that the punch is being driven.

When switch S12 is closed in the continuous running position, clutch motor CM stops with the limit switch S11 in R position holding pin 106 withdrawn from groove 105, thus permitting clutch part 104 to engage the cooperating parts on gear 3. The punching machine will then continue to run until switch S15a is opened and switch S15 is closed. Current now flows through coil 120, switch S15, wire 128, switch S11a, and wires 129 and 123 to line. This closes switch S17 and starts clutch motor CM. The running of this motor operates the reduction gear in case 108 and, since the limit switch S11a is located on the shaft 130 of the reduction gearing, this switch will be caused to turn with the shaft to the S position. As the reduction gearing is rotated, pin 106 lowers and rides on the face 114 of clutch element 104. When cam 111 comes into engagement with the pin 106, retraction of the clutch element takes place as described above.

It has already been stated that if the spacings are short the mechanism of Fig. 1 may be relied upon alone to operate the machine. Also, a machine provided with the electrical control of Fig. 1 may be manually controlled to make single punchings or any desired number. When the machine is provided with the control illustrated in Fig. 1A, in addition to that of Fig. 1, single punchings may be made or the machine may be run automatically if desired. The principal difference between the two operations is that the control of Fig. 1 makes the operation of the spacing machine dependent upon the punch, while that of Fig. 1A makes the operation of the punch dependent upon the operation of the spacing machine when S12 is closed on the single stroke side and switch S13 is closed.

Figs. 1A and 12, when considered in connection with Figs. 1 and 5A, show how the control of Fig. 1A is tied into that of Fig. 1. As indicated above switch S10 is similar to S4 'and similarly located but operates reversely thereto. That is to say, when the switch S4 is closed S10 is opened and conversely when S4 is open S10 is closed. The parts of this switch and its operating mechanism are numbered similarly to the parts of switch S4 but have a numeral 1 prefixed. As shown in Fig. 12, switch S10 is carried adjacent S4 and actuated by the pawl 38 in a manner comparable to the operation of switch S4.

The manual momentary closure of switch S14 can be replaced by substituting for this switch the motor operated switch S14a shown in Figs. 1A, 29 and 30. When either switch S14 or Sa is closed, the coil 120 is energized and switches S16a and S17 are closed. The function of the switch S14 has been explained above and this need not be here repeated.

The structures shown in Figs. 29 and 30 will be next described. Reference will now be made to sheets 2 and 7. The location of the switch S14a in the circuit is indicated in Fig. 1A where this switch is shown as being connected in parallel with the switch S14. A base 210 has rising therefrom a series of brackets 211, 212 and 213. Upon the first of these is pivoted a lever 214 which is connected at 215 with a slidable block 216 having a switch element 217 pivotally carried thereby. This switch element is suitably insulated from the block 216 but is itself constructed of conducting material. To this member 217 is connected a lead 218 which is also connected to the wire 121. One end of the member 217 is faced with insulating material 219 for a purpose to be referred to presently. Pivotally connected to the bracket 213 is a switch element 220 which has a conductor 221 connected thereto. This switch element is suitably insulated from the bracket 213 as will be readily understood. As in the case of element 217, element 220 has one end faced with insulating material, as shown at 222. The conductor 221 is connected between switch S14 and switch S15a or is connected to wire 125, as desired. This conductor 221 might equally as well be connected to the wire leading from wire 125 to switch S13 as it would function in the same way.

A variable speed reducer 223 has a cam 224 mounted upon its shaft 225 and this cam is engaged by one arm of the lever 214. A spring 226 normally holds this arm of the lever 214 against the cam and therefore causes the raising of block 216 when the end of the arm drops off from the high spot on the cam to the low spot. When this happens, the switch elements 217 and 220 are momentarily brought into contact, thus closing for an instant the switch S14a and forming a shunt around the switch S14. As the element 217 rises, it passes element 220 and the insulation 219 is then above the insulation 222. As the cam 224 is rotated, the long arm of lever 214 is gradually lowered, thus lowering element 217. The insulating member 219 first contacts with member 222 and then slides along and past this until member 217 drops down below member 220. During this operation, members 217 and 220 do not come into contact and the circuit is therefore not closed through this switch at that time. The structure and operation of the variable speed reducer 223 is well known and therefore does not need to be explained at this time. The speed reducer is connected to a motor 227 by means of a belt 228 or any other suitable means. Since the motor 227 is a constant speed motor, the rate at which the switch S14a operates can be controlled and properly adjusted by suitable adjustment of the variable speed reducer 223 as will be readily understood. The purpose of the mechanism just described is to substitute automatic operation for the manual operation which is incident to the use of switch S14. However, since manual operation is sometimes desirable, it is not found advisable to dispense entirely with the switch S14.

*Construction of Figs. 21 to 28*

By suitable changes in certain parts of the punching machine and of the spacing machine, it is possible to use this mechanism in connection with curved work as well as straight work and to arrange the metal to be punched so that it will occupy vertical, horizontal or any other desired position.

In the construction shown in Figs. 21 to 28, the same invention is applied in a somewhat different way from the structure shown in Figs. 1 to 20. In this construction the work is circular and is rotated about an axis. The template bars are also circular instead of being straight as shown in the construction previously described. As shown in Fig. 21, these template bars may be united into a single bar by setting the stop pins in rows around the periphery of the bar, the rows being offset laterally with relation to each other. Another distinction of this construction with relation to the construction previously described is that there is no manual reversal of the direction of travel of the work. In the construction described above there were provided limit switches S6 and S8. In this construction, there is no necessity for these limit switches since there is no possibility of a carriage being carried off a track. A switch S9a replaces the switch S9 because a portion of the latter is unnecessary in the present construction. Switches S11, S12, S15 and S15a are omitted and have no counterpart in this form of our invention.

In the form now being described, numeral 145 designates the frame of a C-frame punch and carried by this frame is a die block 146. Arranged above the die block is the customary punch head 147 which carries the punch holder 148, carrying a plurality of sets of punches 149. The head 147 is operated from the punch shaft 2 in the customary manner, power being transmitted through a belt 151, shaft 152 and gears 153 and 3. If desired, an electric motor may be used to drive the shaft 152. Any usual clutch such as 104 may be used to connect the gear 3 to the shaft 2. In this instance, this is shown as a jaw clutch. The parts between clutch motor CM and shaft 2 are similar to those described above in connection with Figs. 16 to 19. As shown in Figs. 21 and 23, link 109 is connected through a lever 109a with pin 106 instead of directly as in Fig. 16. Carried on the end of shaft 2, as shown in Fig. 21, is a limit switch S2 shown in Figs. 1 and 13.

Mounted in the lower portion of the frame 145 is a shaft 154 which carries on one end a driving means such as a belt wheel 25 and at its opposite end a gripper frame 156. This gripper frame or spider comprises a hub and a plurality of arms as shown best in Fig. 22. This spider is rigidly secured to the shaft and therefore rotates therewith. At their extremities, the spider arms carry grippers 157 whose purpose is to grip the work, in this case the flange 158 of the rim, which is to be operated upon. When the rims are not provided with flanges the mechanism is suitably modified to grip the edge of the rim. Adjusting means 159 is provided whereby the gripper jaws may be caused to tightly hold this flange. These jaws are pivotally carried at the outer extremities of slidable elements 160 which carry at their inner ends anti-friction means 161 which cooperate with the cams 162 carried by the ring 163 mounted upon the hub of the spider. This ring has means 164 whereby it may be manually turned to force the elements 160 outwards into position such that the grippers may take hold of the flange 158. The elements 160 are moved in the opposite direction by means of the springs 165 or in any other suitable way. Either mounted upon the base of the machine or upon the frame thereof are supporting and guiding rollers 166 which bear the weight of the rim 158 and which enable the same to be properly centered with relation to the shaft 154. Hand wheels 167 are provided, by means of which the shafts 169 may be rotated. On these shafts are worms which mesh with worm wheels 168 by means of which the height of the rollers 166 may be adjusted to adjust the position of the rim 158. In the form shown in Fig. 26, the rollers 166 are mounted upon eccentric shafts 166a carried by brackets 166b upon the frame and adjustment of the rim may be made by properly adjusting the position of these shafts, the form of which is shown in Fig. 28. This adjustment can be made by loosening the set screws 166c and turning shafts 166a until the rollers 166 bear the major portion of the weight of rim 158.

When rims of different sizes are to be operated upon it is necessary to adjust the height of the shaft 154 so that the distance from the center thereof to the rim will equal the radius of the rim. In order to accomplish this, adjusting screws 171 are provided which are connected to the bearing of the shaft. These screws extend through brackets 172 on the frame of the machine and have worm wheels 173 mounted thereon. Worms on the shaft 174 cooperate with these worm wheels and make it possible by turning the wheel 175 to adjust the height of the shaft bearings and with them the shaft 154. It will be understood that the shaft 174 and hand wheel 175 are located low enough to permit shaft 154 to move downwardly the requisite amount, brackets 172 having sufficient length to permit this. A bracket 176 is so connected by a link 176a with the bearing at the right side of Fig. 21 that the shelf 177 and the switches mounted thereon are caused to move vertically with the shaft 154. Slots 176b are provided in bracket 176 to permit this to move vertically with relation to the bolts 176c. When a proper vertical adjustment has been secured these bolts are tightened up to hold the bracket in properly adjusted position. The belt wheel 25 is driven through the belt 26 by the motor M which operates through a speed reduction gearing in casing 22. The belt is kept taut by any suitable tightening device 27. It is of course understood that the driving means for the shaft 154 is merely typical of any suitable mechanism for imparting rotary motion to this shaft.

Also mounted on the shaft 154 is a wheel 182 which carries, in the present instance, a single template band or bar 36a in which are mounted a plurality of series of stop pins 37. Also carried by wheel 182 is a segmental plate 183 provided with stop pins 184 corresponding to the several rows of stop pins 37 of band or bar 36a. These pins 37 are the same as the pins 37 of the previously described construction. In this construction, also, are provided elements 38 and 59, shown most clearly in Figs. 5 to 7 and 25. A cam 185 cooperates with the stop pins 184 to serve as limiting means for the forward motion of the machine. This cam 185 is mounted on a shaft 186 to which is secured a crank arm 187 connected through an adjustable link 188 with the crank 189 operating the switch drum 190. This switch corresponds to the upper half of switch S6 as shown in Fig. 1 and is referred to as S6a. As indicated above, the function of this switch is to break the electrical circuit in which it is placed when the cam 185 rides up on pin 184.

Parts 38, 40, 41, 41a, 39, 70 and 72 (Fig. 25) operate in this construction in a manner corresponding to their operation in the previously described construction. The link 191 is connected to the link 40 so as to be actuated by cam 38 when this rides up over pins 37. The raising of the pawl 38, as will be understood, raises link 191 and turns the drum of switch S10 so as to close the circuit through this switch and coil 120, thereby closing switches S16 and S17, through contact fingers L and S of switch S11.

Member 59a, carrying cam 59 is secured to shaft 58, as described heretofore, and operates switch S5 in a manner previously described. Guides 75, 76, 77 and 78 for the slidable carriage are replaced in the present form by a guide way in shelf 177 having plates 192 held in place by any suitable means such as bolts 193. This provides a slide-way which is just loose enough to permit the block 194 to slide freely therein. This block has a U-frame 195 secured thereon in any suitable manner as by bolts 196. This furnishes a suitable mounting member for the switches S4, S5, S6a and S10 as will be evident from Fig. 25. This assembly is moved longitudinally of the slide-way by means of the link 45 and lever 42, as described heretofore, and a handle 197 as shown in Fig. 21. The notches 43 in this construction are provided in the handle instead of in a bracket 44 as shown in Fig. 10. This handle slides through the locking guide 198 and, when raised, it engages link 199 mounted in suitable brackets on the side of the punch frame 145. Link 199 is pivotally connected with the crank 200 of a switch S3a, similar to switch S3 and in series therewith. The purpose of this switch is to serve as a safety device to open the control circuit of the magnetic switch S1 which controls the functioning of the traversing motor M. When the handle 197 is raised, as it must be before the carriage 194 can be shifted laterally, the switch S3a is opened, thus preventing any traversing movement of the work while carriage 194 is being shifted.

Suitable means is provided in connection with the punch head and punch holder to make one or another of the sets of punches effective, depending upon which set of holes it is desired to punch. Stripper bars 201 are pivotally connected to the bolster or die block so that they may be swung laterally out of the way when putting in work or removing same. As shown in Fig. 22, these stripper bars are held in operative position by means of the locking bar 202 and bolts in die block 146. This mechanism holds the rim 158 down when the punches 149 are being withdrawn from the work.

A hand wheel 203 on shaft 2 serves as means for manually rotating this shaft to lower the punches when setting the dies with relation to the punches.

In this application the term "bar", used with relation to the template bar is intended to apply, whether the metal be straight as in Figs. 2 to 7 or curved as in Figs. 21 to 27.

It is of course understood that the specific description of structure set forth above may be departed from without departing from the spirit of our invention as set forth in this specification and the appended claims.

Having now described our invention.

We claim:

1. In a spacing machine, a carriage, motive means for advancing and returning said carriage, stops for said carriage, slidable means engaging the stops for automatically stopping said carriage advancing motive means, and means to automatically return the carriage to the stops with the stop engaging means in engagement therewith.

2. In a spacing machine, a carriage, motive means for advancing and returning said carriage, stops for said carriage, longitudinally reciprocating means for engaging said stops and automatically stopping said carriage advancing motive means, means to automatically return the carriage to the stops, and means to hold it there.

3. In a spacing machine, a carriage, a reversible motor to operate said carriage, a reversing switch in the motor control circuit normally biased to "off" position, a stop to predetermine the stopping position of the carriage, and means to automatically predetermine whether the motor shall move the carriage in a forward or reverse direction.

4. In a spacing machine, work supports, a motor to move work over the work supports, stops to predetermine the points where the work shall stop, automatically functioning slidable means co-acting with the stops to stop the work advancing motor, means to automatically reverse the direction of travel of the work to bring the first named means into engagement with the stops so that the work will be stopped, and means to hold said first named means in engagement with said stops.

5. In a spacing machine, work supports, a carriage to move work over the supports, a motor actuating said carriage, stops to predetermine the points where the work shall stop, means cooperating with the stops to stop the work, and automatically functioning longitudinally slidable means to reverse the carriage advancing motor and the direction of travel of the work to bring the first named means into engagement with the stops so that the work will be stopped.

6. In a spacing machine, a supporting framework, a carriage adapted to reciprocate along said frame work, power means to move the carriage, means to control automatically the functioning of the power means whereby the carriage may be caused to move either forwardly or backwardly in accordance with the positions of certain controlling elements, controlling elements associated with the framework, other controlling elements associated with the carriage and cooperating with the first named controlling elements to predetermine the functioning of the power means.

7. In a spacing machine, a supporting frame with runways, a carriage mounted and movable thereon, power means for moving the carriage on the runways, controlling means to predetermine the direction and amount of movement of the carriage, including means to automatically limit the amount of forward travel, to cause reverse travel, and to limit the amount of reverse travel.

8. In a spacing machine, a table, a motor to reciprocate said table, means to control the direction of running of said motor, automatic means to limit the extreme motion of the table, means to stop the table at intermediate points and cause reversal thereof, and means to stop the reverse movement of the table.

9. In a spacing machine, a supporting framework, a template bar thereon having stop elements, a traversing carriage movable on the framework, a motor causing movement of the carriage, a pawl carried by the carriage and cooperating with the stop elements on the bar, a spacing cam carried by the carriage, circuits controlling the motor, switches controlling a plurality of said circuits, connections between the pawl and one of the switches and between the cam and one of the switches whereby operation of the pawl or cam by the stop elements will cause operation of the respective switches.

10. In a spacing machine, a supporting framework, a plurality of template bars thereon having stop elements, a carriage movable on the framework, a motor causing movement of the carriage, a pawl carried by the carriage and cooperating with the stop elements on the bars, circuits controlling the functioning of the motor, a switch controlling one of said circuits, connections between the pawl and switch whereby operation of the pawl by the stop elements will cause opening of the switch, and means for shifting the pawl so that it will cooperate with one or another of the template bars.

11. In a spacing machine, a supporting framework, a plurality of template bars thereon having stop elements, a traversing carriage movable on the framework, a motor causing movement of the carriage, a pawl carried by the carriage and cooperating with the stop elements on the bars, a spacing cam carried by the carriage, circuits controlling the functioning of the motor, switches controlling a plurality of said circuits, connections between the pawl and one of the switches and between the cam and one of the switches whereby operation of the pawl or cam by one of the stop elements will cause operation of the respective switch and means for shifting the pawl and cam so that they will cooperate with one or another of the template bars.

12. In a spacing machine, supporting means, a carriage traversing thereon, a motor to reciprocate the carriage on the supporting means, a reversing switch controlling the functioning of the motor, switches controlling the functioning of the reversing switch, a template bar having stop elements for actuating some of said switches, one of said switches serving to convert the machine from a manually controlled machine to an automatically controlled machine and vice versa.

13. In a spacing machine, a supporting framework, a plurality of template bars associated with the framework and having stop elements thereon, a carriage movable with relation to the framework and adapted to move the work with relation to the machine, a motor causing movement of the carriage, a pawl associated with the template bars and cooperating with the stop elements thereon, circuits controlling the functioning of the motor, a switch controlling one of said circuits, connections between the pawl and switch whereby operation of the pawl by the stop elements will cause opening of the switch, and means for shifting the pawl so that it will cooperate with one or another of the rows of stop elements on the template bars.

14. In an automatic spacer, a supporting framework, a shaft rotatably mounted therein, means for holding the work to be operated upon, a template bar carrying spacing pins in definite spaced relation, motive means for rotating the shaft to advance the work, and means to periodically stop the shaft and reverse the same to bring the work to definite predetermined positions, in combination with means for automatically controlling the functioning of the motive means.

15. In a machine of the character described, mechanism for operating upon work, rotary means for advancing the work periodically through the machine, other rotary means connected to and functioning with the first named rotary means to cause rotation thereof, driving means for the rotary means, means for periodically stopping and reversing the rotary means so that they will occupy definite predetermined positions, means to cause the mechanism to function during the time the rotary means are stopped, and means to stop the functioning of the mechanism during the time the rotary means are rotating.

16. In a spacing machine, a supporting framework, a carriage reciprocable on said framework, motive means for advancing and returning said carriage, worm gear connections between the carriage and the motive means so that when the carriage is advanced in either direction by the motive means and is then stopped, the worm will serve as a lock to hold the carriage in the position in which stopped, means for automatically stopping the carriage, including stop elements, and means for automatically returning the carriage to the stop elements to be held there by the worm gear.

17. In a machine of the character described, a supporting frame, a work carrier supported by and movable with relation to the frame, means for moving the work carrier including a motor, worm gear mechanism connecting the motor and the work carrier, means including stop elements to predetermine where the work carrier shall stop, means to cause reversal of the work carrier, and means carried by the work carrier to cooperate with the stop elements in definitely locating the work carrier when stopped, said worm gear mechanism serving to lock the work carrier in definite predetermined positions.

18. A spacing machine including a traveling carriage operated by an electric motor, means to break the electric circuit to the motor automatically, at predetermined intervals, means to reverse the motor automatically, means to again break the circuit automatically, and means to positively determine the stopping position of the carriage.

19. In a spacing machine, a spacing carriage operated by an electric motor, means to break the circuit to the motor automatically, means to reverse the motor automatically, means to cut off the current from the motor automatically after reversal thereof, and a stop to determine positively the stopping position of the carriage.

20. In a spacing machine, a spacing carriage operated by an electric motor, means to break the circuit to the motor automatically, means to reverse the motor automatically, means to cut off the current from the motor automatically after reversal thereof, means to predetermine accurately the stopping positions of the carriage, and locking means to hold the carriage in stop positions.

21. A spacing machine comprising a bed frame with runways, a spacing carriage operated on said runways by an electric motor, and triggers located along said bed frame adapted to contact with the carriage to break the electric circuit to the motor, to reverse the motor and to again cut off the current to the motor automatically.

22. A spacing machine including a bed frame with runways, a carriage with electric motor to travel same on said runways, trigger stops along the bed frame adapted to contact with said carriage, means coacting with the trigger stops to break the electric circuit, to reverse the motor in order to return the carriage to said stops automatically, and to cut off the current to the motor automatically after reversal thereof.

23. A spacing machine including a bed frame with runways, a carriage having an electric motor to travel same on said runways, trigger stops along the bed frame adapted to contact with said carriage, means coacting with the trigger stops to break the electric circuit, to reverse the motor in order to return the carriage to said stops automatically, to cut off the current to the motor automatically after reversal thereof and means to hold the carriage with its coacting means against the trigger stops to prevent recoil thereof after contacting with a stop.

HENRY E. HINTZ.
GEORGE P. KLINE.